Aug. 26, 1947.   H. F. FRANKLIN   2,426,498
CLAMP STRUCTURE
Filed Oct. 22, 1943   3 Sheets-Sheet 1
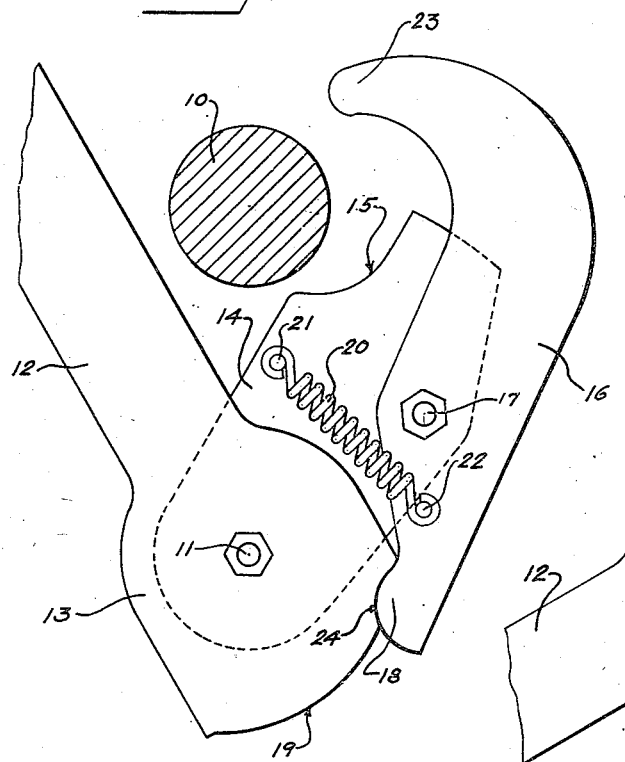
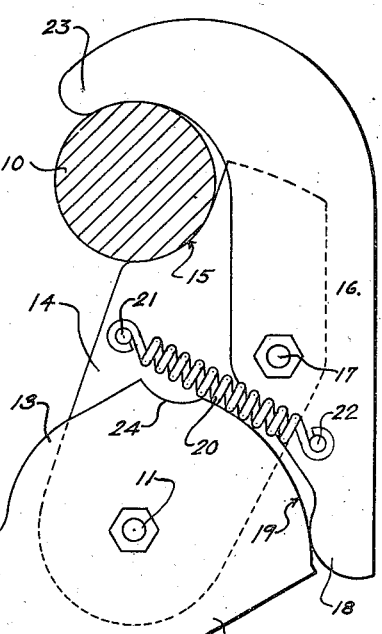
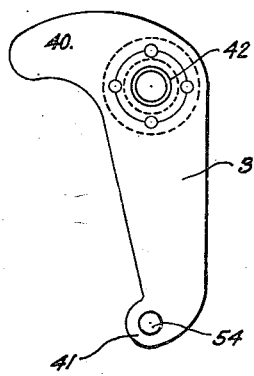
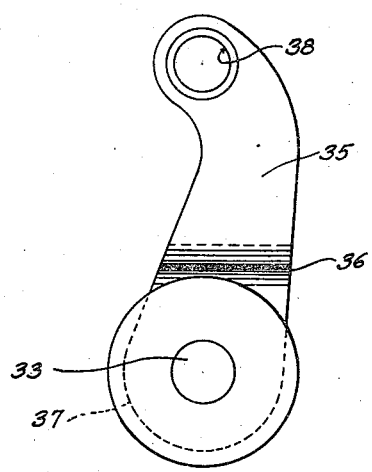
Hubert F. Franklin
INVENTOR
BY Robert C. Roche
ATTORNEY

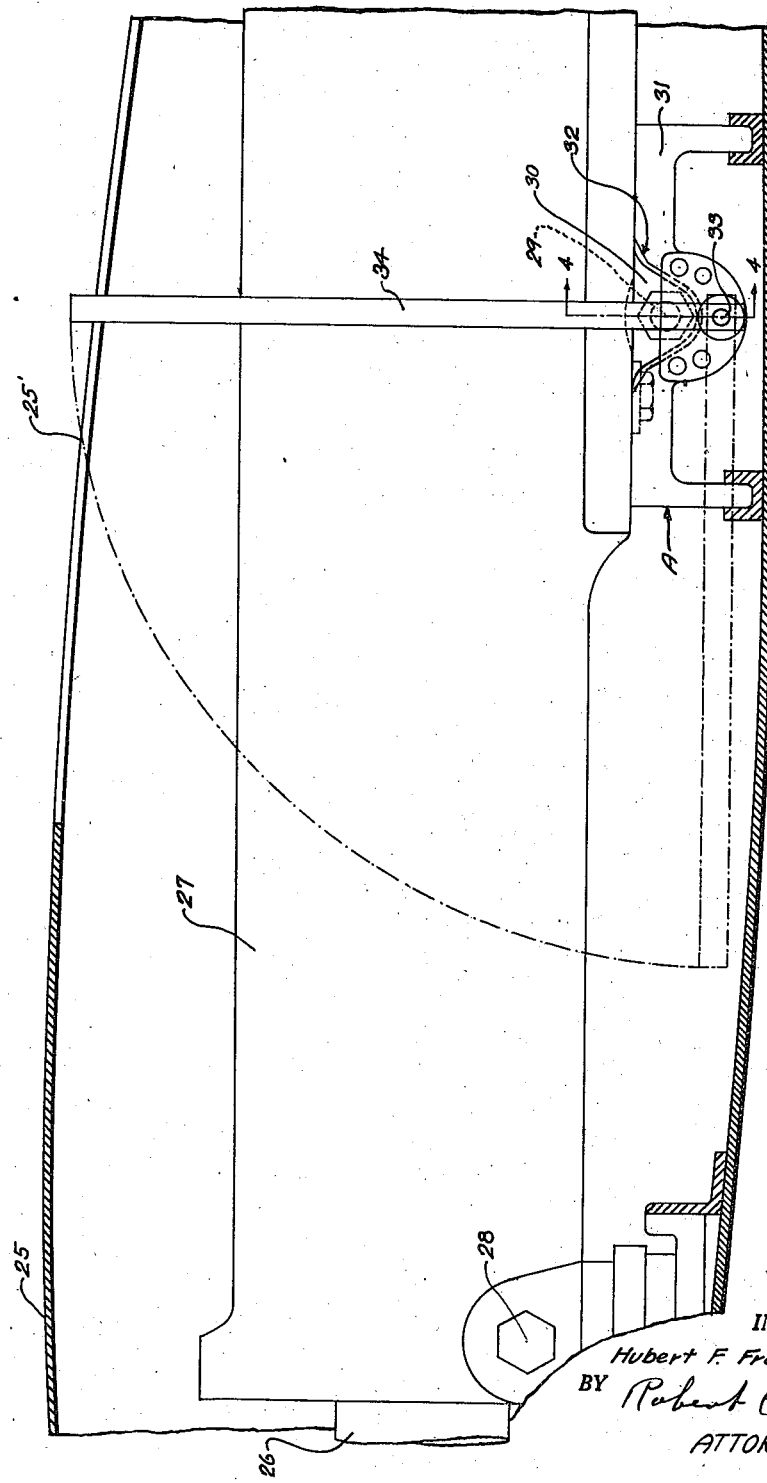

Aug. 26, 1947. H. F. FRANKLIN 2,426,498
CLAMP STRUCTURE
Filed Oct. 22, 1943 3 Sheets-Sheet 3
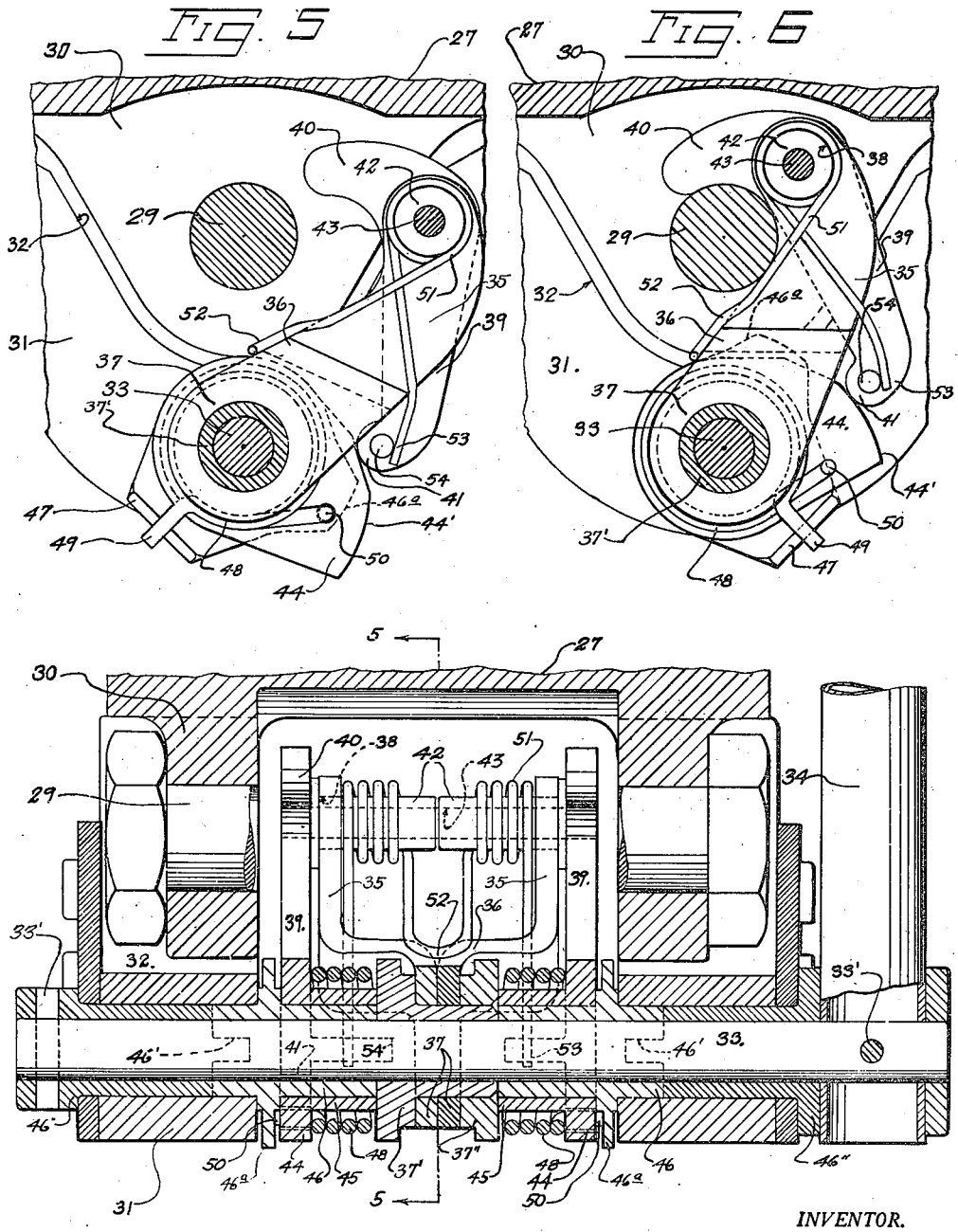
INVENTOR.
Hubert F. Franklin
BY Robert C. Roche
ATTORNEY Patented Aug. 26, 1947

2,426,498

UNITED STATES PATENT OFFICE 2,426,498

CLAMP STRUCTURE

Hubert F. Franklin, Baldwin, N. Y., assignor to Republic Aviation Corporation, a corporation of Delaware Application October 22, 1943, Serial No. 507,321

19 Claims. (Cl. 248—361)

This invention relates to clamp structures and contemplates the ready engagement and release of the work or clamped piece, the rigid holding of it from displacement when engaged and the compensation of variations in size and tolerance in its engagement.

While the instant invention and devices made in accordance with its teachings manifestly have various uses and are of general application, one of its primary purposes is to removably secure the butt end of a machine gun or other armament to the rear mount provided in the wing of an aircraft, without essentially interfering with the aiming or adjusting thereof or with its adjustment for aiming purposes.

The present concept contemplates the employment of a plurality of work engaging members movable as a unit to and from work engaging position and movable relatively to engage or clamp a workpiece after movement to engaging position or to release the work piece prior to movement from engaging position, all by means of a single control element and actuating member for the work engaging and releasing relative movement of the engaging members.

With the above and other objects in view, as will be apparent, the invention consists in the construction, combination and arrangement of parts, all as hereinafter more fully described, claimed and illustrated in the accompanying drawings, wherein:

Fig. 1 is an elevation of the present clamp structure prior to its engaging or clamping cooperation with a work piece, the same being shown schematically to illustrate the fundamental concept of this invention and its general construction and operation.

Fig. 2 is a similar view illustrating the work engaging members of the present device in clamping or engaging cooperation with a work piece.

Fig. 3 is a fragmentary transverse section through the wing of an aircraft illustrating the adaptation or modification of the present invention to function in cooperation with the rear mount of the machine gun to be carried within the wing of an aircraft.

Fig. 4 is an enlarged vertical section taken along line 4—4 of Fig. 3.

Fig. 5 is a vertical section along line 5—5 of Fig. 4 to illustrate that embodiment of the clamp structure prior to its clamping engagement of the mounting pin at the butt end of a machine gun.

Fig. 6 is a view similar to Fig. 5 illustrating the present clamp structure in clamping engagement of the mounting pin at the butt end of a gun.

Fig. 7 is a detailed elevation of the latch forming one of the work engaging members of that form of the invention illustrated in Figs. 3 to 6 inclusive, and Fig. 8 is a similar view of the carrier plate forming the other of the work engaging members of that embodiment of the invention shown in Figs. 3 to 6 inclusive, and which supports or carries the latch illustrated in Fig. 7.

The present invention has a wide variety of uses and adaptations such, for instance, as a vise or as a wrench. Figs. 1 and 2 illustrate, somewhat schematically, the general construction and principles of the present invention which may be structurally modified and adapted to almost any use where a rigid but releasable engagement of a work piece is desired and which will accommodate and compensate for variations in size and tolerances. Figs. 3 to 8 illustrate one of the adaptations or structural modifications whereby the clamp structure of the present invention removably secures the butt end assembly of a machine gun to the rear gun mount within the wing of an aircraft. In this adaptation of the invention it is to be observed that the present invenion permits the quick release of the butt end assembly but at the same time firmly engages the gun without interfering in any way with the vertical or azimuth adjustments of its rear mount. Of particular importance is the fact that the presen invention, in functioning to secure a machine gun to its rear mount or in functioning in any other type of assembly, compensates for and accommodates variations and tolerances often occurring when the components of the assembly have different origins.

Reference being had more particularly to the drawing, and especially to Figs. 1 and 2, 10 designates the work piece to be engaged, which may be the mounting pin of a machine gun or any other device or member which is to be releasably clamped or engaged. The clamp structure forming the subject matter of the present invention comprises a pivot pin or fulcrum 11 upon which a lever 12 is mounted for oscillation. At and surrounding the pivot pin 11 the lever 12 is enlarged to create an actuating cam plate 13 which constitutes the inner terminal of the lever 12 and actually is the medium through which the lever 12 is mounted on the pin 11. Thus as the lever oscillates upon the pin 11, so moves the cam plate 13, which obviously may not only be integral with the lever 12 but may be separate therefrom and suitably mounted for movement with the lever.

One of a plurality of work engaging members is pivotally mounted on the pin 11 and comprises a carrier plate 14 resting flush against or adjoining one face of the cam plate 13. The outer extremity of this carrier plate 14 contacts with and approximately under the work piece 10 as the lever moves about the pin 11 or downwardly from the position shown in Fig. 1 in a manner and for the purpose to be hereinafter more fully described, and to that end the inner edge of the carrier plate 14 may be recessed to form a seat 15 for contact with and engagement of the work piece 10 if so desired, although this seat 15 is not essential to the operation of the device.

Another of the plurality of work engaging members is the latch 16 pivoted, as at 17, to the carrier plate 14 to swing about the pivot 17 under the influence of the cam plate 13. For that purpose the inner end of the latch 16 is provided with a rounded toe 18 which operates against the eccentric outer edge 19 of the cam plate 13 and is maintained in constant contact therewith by means of the retractile coil spring 20 interposed between the pins 21 and 22, respectively secured to the carrier plate 14 and the latch 16. The opposite end of the latch 16, viz: that end opposed to the toe 18, is provided with a latch hook 23 designed to engage over the work piece 10 as hereinafter more fully described.

In considering the operation of the present device, as shown in Figs. 1 and 2, it is to be borne in mind that the pivot 11 thereof is generally stationary, either by being attached to a fixed support or by being held or supported against movement as part of a portable tool or implement. Thus, the movement of the lever 12 from the position shown in Fig. 1, wherein the toe 18 of the latch seats in a notch 24 formed at the end of the cam edge 19 nearest the pivot 11 and the carrier plate 14, together with the latch 16 lie in an open position away from the work piece 10, causes the carrier plate 14 to swing about the pivot 11 until its inner edge or the seat 15 thereof contacts the work piece or member 10. The contact between the inner edge of the carrier plate 14 and the stationary work piece 10 arrests the movement of the carrier plate about the pivot 11, and the lever 12 together with the cam plate 13 may continue moving about the pivot 11. This continued movement of the cam plate 13 about the pivot 11 causes the toe 18 of the latch plate to ride out of the seat 24 and along the eccentric edge 19 of the cam 13 thereby swinging the latch plate 16 about its pivot 17, which at that moment is fixed with respect to the pivot pin 11, against the action of the spring 20 until the hook 23 of the latch extends over the work member 10 to be engaged. The firmness and rigidity of such engagement of the work member 10 between the hook 23 of the latch plate 16 and the seat 15 or edge of the carrier plate 14 is determined by the pressure applied to the lever 12 which in turn is transmitted to the latch 16 by the action of the edge 19 of the cam plate 13 against the toe 18 of the latch.

The spring 20 holds the toe 18 of the latch 16 in frictional engagement wtih the eccentric edge 19 of the cam plate 13 and this is usually sufficient to insure the simultaneous movement of the carrier plate 14 and the cam plate 13 about or with respect to the pivot pin 11 until the pivotal movement of the carrier plate 14 is arrested by contact with the work piece 10. However, to insure this simultaneous movement, that end of the eccentric edge 19 nearest the pivot pin 11 is provided with a depression 24 in which the toe 18 of the latch seats when the engaging elements are fully opened or as illustrated in Fig. 1. The toe 18 remains in the seat 24 until the edge of the carrier plate 14 or its seat 15 contacts the work piece 10 when the movement of the carrier plate is arrested whereupon the continued movement of the lever 12 and of the cam plate 13 causes the toe 18 to ride out of the seat 24 against the action of the spring 20 and along the eccentric edge 19 of the moving cam plate 13 thereby swinging the latch 16 about the pivot 17 until full clamping engagement of the work piece 10 between the carrier plate 14 and the hook 23 of the latch has been attained.

When the movement of the lever 12 and the actuating cam plate 13 is reversed the eccentric edge 19 of the cam plate 13 travels in the reverse direction under the toe 18 until the toe becomes situated in the seat 24 at the low end of the edge 19 permitting the spring 20 to act on the latch 16 to independently and wholly or partly retract the hook 23 from its engaging position over the work piece 10; and at the same time the carrier plate 14 and the actuating plate 13 swing in unison and move away from the work piece 10. By the engagement of the toe 18 of the latch 16 in the seat 24 of the actuating plate 13 or against an edge of the actuating plate, the carrier plate 14 to which the latch 16 is pivoted and the actuating plate 13 swing in unison with respect to the pivot 11 until the toe 18 is in sliding cooperation with the eccentric edge 19 of the actuating plate 13 whereupon carrier plate and cam plate may move relatively as above described.

In this manner the work piece 10 is released from clamping engagement by and between the carrier plate 14 and the latch 16. Manifestly the mechanism shown in Figs. 1 and 2 and above described is a general application and use.

Referring now to Figs. 3 to 8 inclusive, which disclose one adaptation and embodiment of the instant invention, towit: functioning in cooperation with the rear gun mount A in the wing of an aircraft, 25 designates the wing of an aircraft in which is mounted a machine gun 26. This gun 26 has a butt end assembly 27, the forward end of which is suitably supported by trunnions as at 28 and at its rear end is provided with a transverse mounting pin 29 supported by and between the spaced depending ears 30 on the under side of the butt end assembly 27. This form of the invention is designed to cooperate with and engage this pin 29 and thereby mount the butt end assembly 27 of the machine gun 26 within the wing of the plane. To that end a frame 31, constituting a rear gun mount of any standard and adjustable construction, is secured to the inner surface of the wing and has seats 32 for the reception of and coaction with the ears 30 of the butt end assembly 27 of the gun. A transverse shaft 33 is mounted for oscillation in the frame 31 under the influence of the lever 34 and this shaft 33 and lever 34 correspond in operation and in function respectively to the fixed pivot 11 and the lever 12 of the structure shown in Figs. 1 and 2.

In this form of the invention there are two carrier plates 35, one disposed adjoining each ear 30 and these carrier plates are connected at their inner ends by a yoke 36 having a projecting bearing 37 keyed or otherwise secured to a bushing 37' loosely mounted on the central portion of the shaft 33 and held there by a ring collar 37'' permanently encircling one end of said bushing.

At its upper end each carrier plate 35 is provided with an aperture 38 and is disposed at an angle to the longitudinal axis of the remainder of the plate. In this manner two carrier plates 35 are provided and so connected and mounted that they and the yoke 36 and bushing 37' constitute a single unitary element of the structure.

To each carrier plate is pivoted a latch or work engaging member 39 having a laterally disposed hook 40 at one end and a somewhat smaller similarly disposed toe 41 at the opposite end. Adjoining the hook 40 the latch 39 is provided with an outstanding bushing 42 which is received in and passes through the aperture or opening 38 of the cooperating carrier plate 35. A pin 43 passes through the bushings 42 of both latches 39 and unites the outer ends of the carrier plates 35 and the latches 39 pivoted thereto into a unitary structure.

Mounted on the shaft 33 adjacent the toe 41 of each latch plate 39 is an actuating cam plate 44 carried by a collar 45 which encircles a bushing 46 embracing the shaft 33. At one of its ends the bushing 46 has a key connection 46' to a terminal bushing 46'' mounted on the end portion of the shaft 33. Adjacent to the key connection 46' the bushing 46 is provided with a bifurcated ear 47. Thus the shaft 33 is encased by the abutting bushings 46'', 46 and 37' and is free to oscillate within the bushing 37'. The terminal or end bushings 46'' are each secured to the shaft 33 by the pins 33' and one of these pins also may secure the lever 34 to the shaft 33. It is apparent that the terminal bushings 46'' are fixed to the shaft 33 for movement therewith and that the movement of the lever 34 imparts a corresponding movement to the shaft and said terminal bushings. Since the terminal bushings 46'' are fixed to the shaft 33 and by the key connections 46' are fixed to the bushings 46 these elements move in unison and with the shaft 33.

A coil spring 48 encircles the collar 45 and has one of its ends 49 projecting outwardly to be seated in the bifurcation of the ear 47 and its opposite end 50 received in a suitable depression or opening in the cam plate 44. An outstanding brake ear 46ª is formed integrally with the bushing 46 adjacent the bifurcated ear 47 and when the lever 34 and the associated parts are moved to the positions shown in Fig. 6, the brake ears 46ª frictionally contact the ears 30 on the gun butt assembly and thus compensate for and take up any lateral play in the mechanism. The spring 48 is employed to cause the cam plate 44, the yoke 37 and the carrier plates 35 to move in unison on and with the shaft 33 and also to permit a further downward movement of the lever 34 after full locking engagement of the pin 29 has been attained so that it will be flush against the inner face of the wing 25 and may be there secured by any suitable means (not shown). This somewhat limited movement or play permitted by the spring 48 also compensates for any variances in construction, size and arrangement of the several parts of the mount or the gun which might otherwise prevent the full contemplated movement of the lever 34 inwardly of the wing.

In order to maintain the toes 41 of the latches in constant engagement with the eccentric edge 44' of the cam plate 44, a spring 51 is coiled about the bushings 42 of the latches 39 between the carrier plates 35 and is provided with a central finger 52 to engage the yoke 36 unitarily connecting the carrier plates 35. Each end 53 of this spring 51 terminates adjacent the toe 41 of one of the latches 39 and bears against a pin 54 secured to the toe of each latch. In this manner the pressure of the terminals 53 of the spring 51 forces the toes 41 of the two latches 39 into constant engagement with the eccentric edge 44' of the actuating cam plate 44.

When the device is open or in preclamping position, as illustrated in Fig. 5, the lever 34 is elevated and projects through the door 25' in the skin of the wing 25, thereby permitting the mounting pin 29 of the machine gun 26 and the ears 30 carrying it to be positioned in cooperation with the rear gun mount 31 without interference from any of the elements of the present invention. Thereupon the lever 34 may be swung downwardly to a position within the wing which similarly moves the shaft 33 and causes the yoke 36 to also move towards the pin 29 carrying with it the pair of the carrier plates 35 integral therewith. This movement of the carrier plates 35 coincides with the movement of the cam actuating plates 44 mounted for movement with the shaft 33 until the carrier plates 35 contact the pin 29, as illustrated in Fig. 6, thereby arresting their movement. The continued movement of the lever 34 and shaft 33, after the movement of the carrier plates 35 has been thus arrested, causes the cam plates 44, which are the full equivalents of the similar plates 13 in Figs. 1 and 2, to continue moving independently of the yoke 36 and carrier plates 35 so that the eccentric edges 44' thereof elevate the toes 41 of the latches 39 about their pivots 42—43 against the action of the spring 51 to position the hooked ends 40 over and in engagement with the mounting pin 29. Thus the pin 29 is rigidly gripped between the hooks 40 of the latches 39 and the bodies of the carrier plates 35.

Manifestly the downward movement of the lever 34 from the position in Fig. 5 to the position in Fig. 6 moves it clear of the door 25' in the skin of the wing 25 leaving it free to receive a closure.

The reverse movement of the lever 34 restores the parts to their positions as shown in Fig. 5 and permits the removal of the gun 26 and its butt assembly from the wing 25.

What is claimed is:

1. The combination with a plurality of relatively movable work engaging members, of an actuating member for controlling the relative movement of said engaging members, and an operating member for positioning said engaging members as a unit with respect to the work to be engaged.

2. The combination with a fixed pivot, of a plurality of relatively movable work engaging members mounted to be bodily movable as a unit with respect to said pivot, an actuating member for controlling the relative movement of said engaging members, and an operating member cooperating with said pivot for bodily positioning said engaging members.

3. The combination with a fixed pivot, of a plurality of relatively movable work engaging members mounted to be bodily movable as a unit with respect to said pivot, an actuating member for controlling the relative movement of said engaging members, and a lever swingable about said pivot to primarily position said engaging members as a unit and secondarily operate the actuating member.

4. The combination with a fixed pivot, of a plurality of relatively movable work engaging members mounted to be bodily movable as a unit with respect to said pivot, an actuating member for controlling the relative movement of said engaging members, a lever swingable about said pivot for moving said engaging members as a unit, and means whereby the actuating member operates under the influence of the lever.

5. The combination with a fixed pivot, of a plurality of relatively movable work engaging members mounted to be bodily movable as a unit with respect to said pivot, an actuating member for controlling the relative movement of said engaging members, an operating member swingable about said pivot to bodily move said engaging members as a unit until such unitary movement is arrested by a work piece, and means whereby the continued movement of said operating member operates the actuating member to relatively move the work engaging members for the engagement of the work piece.

6. The combination of a fixed pivot member, of a plurality of relatively movable work engaging members, an actuating cam member to move said work engaging members relatively for work engagement and disengagement, a lever for bodily and simultaneously moving said work engaging members to their engaging positions, and means whereby the continued movement of the lever after the work engaging members are in engaging position moves said work engaging members relatively to actually engage the work therebetween.

7. The combination with a pair of relatively movable work engaging members mounted for simultaneous bodily movement as a unit, of an actuating cam member to move said members relatively for work engagement, and a pivotally mounted lever adapted to bodily move said work engaging members during the first part of its movement and to operate the actuating member to move said work engaging members relatively for work engagement during the remainder of its movement.

8. The combination with a pair of work engaging members, one of said members being mounted for bodily movement and the other being pivotally mounted on the first member, an actuating element cooperating with the first of said members, and operating means for controlling said actuating member to position the first of said members bodily in contact with a work piece and thereafter move the other of said members relative to the first.

9. The combination with a pair of relatively movable work engaging members mounted for simultaneous bodily movement, of an actuating member mounted for movement adjacent to and in contact with one end of one of said work engaging members, and means whereby the initial movement of the actuating member causes a simultaneous bodily movement of both of said work engaging members and the continued movement thereof in the same direction causes a relative movement of said engaging members.

10. The combination with a pair of relatively movable work engaging members mounted for simultaneous bodily movement, of an actuating cam member mounted for movement in contact with one end of one of said work engaging members, and means whereby the initial movement of the actuating member causes a simultaneous bodily movement of said work engaging members and the continued movement thereof in the same direction causes the work engaging member contacting the cam member to move relatively to the other of said work engaging members.

11. A clamp structure comprising a lever mounted to swing about a fixed pivot, a carrier plate mounted to oscillate on the same pivot as the lever, a cam plate also mounted to oscillate on the same pivot as the lever, a latch pivoted to said carrier plate slidingly engaging said cam plate at one end and cooperating at its other end with the carrier plate to engage a work member therebetween, and a retractile coil spring interposed between the latch and the carrier plate to maintain the sliding engagement between the latch and the cam plate.

12. The combination with a fixed pivot, of a lever swingable relatively to said pivot, a carrier plate mounted to oscillate on said pivot, a cam plate having an eccentric edge also mounted to oscillate on said pivot, a latch pivoted to said carrier plate having one end bearing on the eccentric edge of the cam plate and its opposite end extending angularly with respect to its body, an operative connection between one extremity of the eccentric edge of the cam plate and the latch whereby the cam and carrier plate oscillate in unison until the movement of the latter is arrested, and means whereby the swinging movement of the lever oscillates the cam plate.

13. The combination with a common pivot, of a carrier plate pivoted thereon, an actuating cam plate mounted on said pivot, a latch pivoted to said carrier plate, and means of contact between a portion of said actuating cam plate and said latch whereby the movement of the actuating plate moves the carrier plate about the pivot and the continued movement of the actuating plate against the latch causes the latter to move relatively to the carrier plate for work engagement.

14. The combination with a shaft, of a yoke mounted for movement thereon, carrier plates fixed to said yoke for movement therewith, a coacting latch pivoted to each carrier plate, a cam carried by the shaft for movement therewith, coacting with the adjacent end of an aligned latch, and means cooperating with the yoke whereby the latches are maintained in constant contact with the cams aforesaid.

15. The combination with a shaft, of series of pairs of work engaging members, means whereby said pairs of engaging members move bodily in unison upon the oscillation of said shaft, and means whereby one of each pair of engaging members may be moved in unison relative to the other of said engaging members.

16. The combination with a shaft, of a plurality of pairs of work engaging members, one of each pair being carried by the other and relatively movable thereto, an operative connection between the shaft and said pairs of engaging members for moving the latter in unison upon the oscillation of said shaft until such movement is arrested by contact with a work piece, and means whereby the continued movement of the shaft moves the carried engaging members in unison relative to their respective companion engaging members.

17. The combination with a shaft, of a plurality of pairs of work engaging members, each pair comprising a carrier and a latch hinged thereto and carried thereby, an operative connection whereby the oscillation of said shaft moves said carriers in unison upon the movement of the shaft until the arrest of such movement by contact with a work piece, and means whereby the continued movement of the shaft thereafter swings the latches in unison relative to the carriers aforesaid for the engagement of a work piece in opposed cooperation with said carriers.

18. The combination with a shaft, of a plurality of pairs of work engaging members, each pair comprising a carrier and a latch hinged thereto and carried thereby, an operative connection whereby the oscillation of said shaft moves said carriers in unison upon the movement of the shaft until the arrest of such movement by contact with a workpiece, an actuating member for cooperation with each latch for swinging it relative to its carrier, and means whereby said actuating members become effective subsequent to the contact of the carriers with a work piece.

19. The combination with a shaft, of a plurality of pairs of work engaging members, each pair comprising a carrier and a latch hinged thereto and carried thereby, an operative connection whereby the oscillation of said shaft moves said carriers in unison upon the movement of the shaft until the arrest of such movement by contact with a work piece, an actuating member for cooperation with each latch for swinging it relative to its carrier, means for operating said actuating members in unison by the movement of the shaft subsequent to the contact between the carriers with a work piece, and resilient means for maintaining operative connection between the latches and the actuating members.

HUBERT F. FRANKLIN.

REFERENCES CITED

The following references are of record in the file of this patent:

UNITED STATES PATENTS

| Number | Name | Date |
|---|---|---|
| 1,665,301 | Hoffman | Apr. 10, 1928 |
| 1,406,910 | Sutherland | Feb. 14, 1922 |
| 1,204,383 | Spanier | Nov. 7, 1916 |
| 1,718,719 | Turner | June 25, 1929 |
| 1,573,409 | Lynch et al. | Feb. 16, 1926 |
| 2,068,902 | Blunt | Jan. 26, 1937 |
| 388,348 | Durfey | Aug. 21, 1888 |
| 1,894,164 | Doht | Jan. 10, 1933 |
| 2,080,527 | Bixel | May 18, 1937 |